UNITED STATES PATENT OFFICE.

GEORGE DAWSON, OF CRESCENT, LOUISIANA.

METHOD OF ATTACHING STEEL TO STEEL OR STEEL TO IRON.

969,610.    Specification of Letters Patent.    Patented Sept. 6, 1910.

No Drawing.    Application filed May 11, 1910.    Serial No. 560,606.

*To all whom it may concern:*

Be it known that I, GEORGE DAWSON, a citizen of the United States, and a resident of Crescent, in the parish of Iberville and State of Louisiana, have invented a new and Improved Method of Attaching Steel to Steel or Steel to Iron, of which the following is a full, clear, and exact description.

The invention has reference to an improved mode of brazing steel, particularly applicable to attaching the ends of a broken band saw.

The object of the invention is to effect the uniform re-tempering of the saw after the temper has been drawn by the heating of the saw incident to the brazing operation, without the re-heating of the saw or plunging the same into water, the latter operation being unsatisfactory in that it is impractical to equalize the temper in the braze with that in the body of the saw in this manner.

In attaching two pieces of steel in accordance with my improved method, such, for example, as the ends of a broken band saw, the saw is placed in the brazing clamps and the solder put between the laps. The brazing irons are then heated sufficiently to melt the solder, after which the irons are applied to the braze. After the irons have been screwed down on the braze, a tempering compound is applied to the thickness of about three-eighths of an inch on either side of the brazing irons on the upper side of the saw, as far back of the irons as the saw heats. When the irons have cooled sufficiently to remove them from the braze, they are taken off and the tempering compound applied to the upper side of the braze and allowed to stand until the braze becomes cold. This equalizes the temper in the braze with that in the body of the saw.

The tempering compound which I preferably use in carrying out my improved method is disclosed in Letters Patent 946,838, granted to me January 18, 1910, and consists of slaked lime and lamp black, eight parts of the former being thoroughly mixed with two parts of the latter. The slaked lime and lamp black draw the temper back into the steel after the hot irons have taken it out and cause the braze to hold tension equal to the rest of the saw.

Having thus described my invention, I claim as new and desire to secure by Letters Patent:

The herein-described method of attaching steel by brazing and re-tempering the same in one heating, which consists in brazing together the ends of the pieces to be attached, applying a dry tempering compound to that portion of the steel heated at the side of the braze incident to the brazing operation, and afterward applying the said compound to the braze.

In testimony whereof I have signed my name to this specification in the presence of two subscribing witnesses.

GEORGE DAWSON.

Witnesses:
PHILIP G. RHORER,
A. JOLY, Jr.